United States Patent
Concin

(10) Patent No.: US 11,284,635 B2
(45) Date of Patent: Mar. 29, 2022

(54) SYSTEM AND METHOD FOR PASTEURIZING FOODS

(71) Applicant: Red Bull GmbH, Fuschl am See (AT)

(72) Inventor: Roland Concin, Fuschl am See (AT)

(73) Assignee: Red Bull GmbH, Fuschl am See (AT)

( * ) Notice: Subject to any disclaimer, the term of this patent is extended or adjusted under 35 U.S.C. 154(b) by 566 days.

(21) Appl. No.: 15/763,897

(22) PCT Filed: Sep. 29, 2016

(86) PCT No.: PCT/EP2016/073344
§ 371 (c)(1),
(2) Date: May 30, 2018

(87) PCT Pub. No.: WO2017/055501
PCT Pub. Date: Apr. 6, 2017

(65) Prior Publication Data
US 2018/0325147 A1    Nov. 15, 2018

(30) Foreign Application Priority Data

Sep. 29, 2015    (AT) .............................. A 50822/2015

(51) Int. Cl.
*A23L 3/04*    (2006.01)
*A23L 3/00*    (2006.01)

(52) U.S. Cl.
CPC ................ *A23L 3/04* (2013.01); *A23L 3/001* (2013.01); *A23V 2002/00* (2013.01); *Y02A 40/963* (2018.01); *Y02P 60/85* (2015.11)

(58) Field of Classification Search
CPC ........... G05B 19/042; G05B 2219/2639; H02J 2203/20; H02J 2300/20; H02J 3/28;
(Continued)

(56) References Cited

U.S. PATENT DOCUMENTS 3,622,357 A * 11/1971 Tillman .................... C12H 1/18
99/370
4,331,629 A * 5/1982 Huling ...................... A23L 3/04
422/105
(Continued)

FOREIGN PATENT DOCUMENTS

DE       101 02 041 A1    8/2002
DE    10 2005 030 924 A1    8/2006
(Continued)

OTHER PUBLICATIONS

Document entitled JP2011255952A—Heating sterilization system, English machine translation of JP2011255952A provided by Google Patents, original document published Dec. 22, 2011 (Year: 2011).*
(Continued)

*Primary Examiner* — Holly Kipouros
(74) *Attorney, Agent, or Firm* — Collard & Roe, P.C.

(57) ABSTRACT

The invention relates to a system (1) and a method for pasteurizing foods packed in closed containers (2). The containers (2) are supplied with a processing liquid (11) in at least one heating zone (5,6), at least one pasteurization zone (7, 8), and at least one cooling zone (9, 10). In order to cool and heat the processing liquid (11) as needed, a coolant (23) is cooled by means of a heat pump (22) in a cooling circuit (20), and a heating medium (33) is heated by means of the heat pump (22) in a heating circuit via a respective heat exchanger (19, 30) in each case. In order to provide cooling energy, the cooled coolant (23) is introduced into a lower end region of a cold buffer store (24), and in order to provide heating energy the heated heating medium (33) is introduced into an upper end region of a heat buffer store (35).

22 Claims, 1 Drawing Sheet

(58) Field of Classification Search
CPC .... H02J 3/38; H02J 3/381; H02J 3/382; H02J 3/383; H02J 3/386; H02J 3/46; Y02E 60/76; Y02E 70/30; Y04S 40/22; A23L 3/001; A23L 3/04; A23V 2002/00; Y02A 40/965; Y02P 60/85
See application file for complete search history.

(56) References Cited

U.S. PATENT DOCUMENTS

| | | | | |
|---|---|---|---|---|
| 4,490,401 | A * | 12/1984 | Becker | A23L 3/003 426/407 |
| 8,156,714 | B2 * | 4/2012 | Munzer | A23L 3/02 53/127 |
| 8,479,782 | B2 * | 7/2013 | Mastio | A61L 2/082 141/144 |
| 2013/0064952 | A1 * | 3/2013 | Cadeo | A23L 3/003 426/521 |

FOREIGN PATENT DOCUMENTS

| | | |
|---|---|---|
| DE | 10 2007 003 976 A1 | 7/2008 |
| DE | 10 2008 057 495 A1 | 5/2010 |
| DE | 10 2010 060 919 A1 | 6/2012 |
| DE | 10 2011 055 147 A1 | 5/2013 |
| DE | 10 2013 112 398 A1 | 5/2015 |
| JP | 2011255952 A * | 12/2011 |
| WO | 2013/023739 A1 | 2/2013 |
| WO | 2015/071168 A1 | 5/2015 |

OTHER PUBLICATIONS

International Search Report of PCT/EP2016/073344, dated Dec. 2, 2016.

* cited by examiner

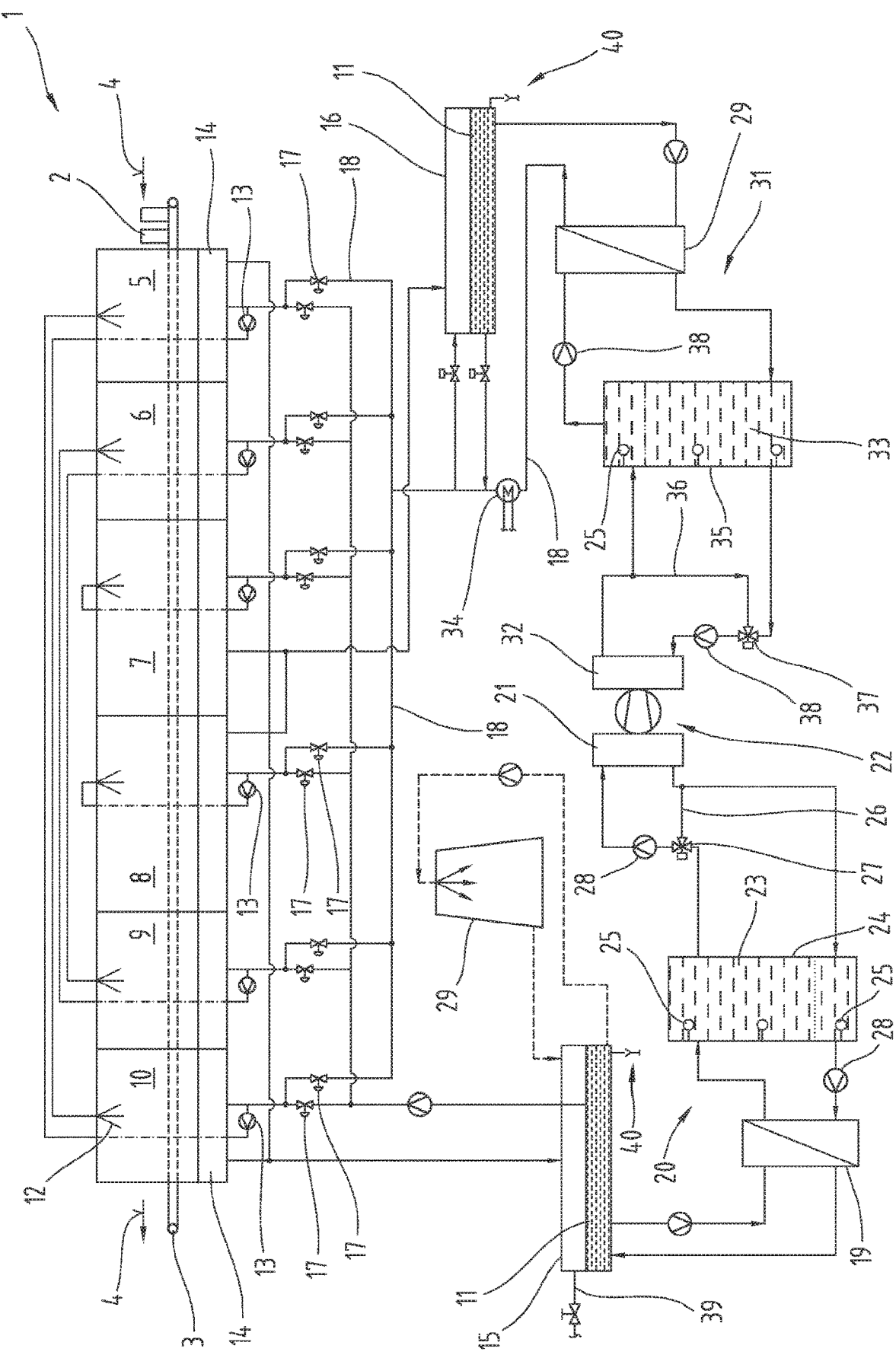

SYSTEM AND METHOD FOR PASTEURIZING FOODS

CROSS REFERENCE TO RELATED APPLICATIONS

This application is the National Stage of PCT/EP2016/073344 filed on Sep. 29, 2016, which claims priority under 35 U.S.C. § 119 of Austrian Application No. A 50822/2015 filed on Sep. 29, 2015, the disclosure of which is incorporated by reference. The international application under PCT article 21(2) was not published in English.

The invention relates to a system for pasteurizing foods packed in closed containers and a method for pasteurizing foods packed in closed containers.

Nowadays, foods, especially liquid foods, are often pasteurized to destroy potentially harmful microorganisms in the foods and also to increase the storage life of the foods. In a widely used method, foods are packed in containers beforehand, the containers are closed, and then they are pasteurized. So-called tunnel pasteurizers are often used in which the closed containers are initially supplied with, for example, sprinkled or showered with, a process medium in treatment zones with successively rising temperatures. These are followed by treatment zones in which the containers are brought to pasteurization temperature in this manner and kept at this temperature for a defined and adequate duration. They are then successively cooled down in additional treatment zones.

In the case of a typical pasteurizer, for example a tunnel pasteurizer, both cooling and heating energy are accordingly required to heat the processing liquid, especially for the heating zones and pasteurization zones, and also to cool it down for the cooling zones. According to the prior art, heat pumps may be used to provide heating and cooling energy. For example, DE 10 2013 112 398 A1 describes a device and a method in which the heating energy of the processing liquid is used at a low temperature level by means of a heat pump to heat the processing liquid in a buffer tank to a higher temperature level. In the pasteurizer disclosed in DE 10 2013 112 398 A1, the heat pump is connected directly or immediately to pipes conveying processing liquid or specific treatment zones by means of heat exchangers.

In such cases, it is only possible to provide large quantities of cooling or heating energy by using a heat pump with a relatively small consumption of electrical energy, for example, if the conditions are favorable. These favorable conditions only apply if there is a high demand for cooling and heat output in the pasteurizer, on the one hand, and if there is simultaneously an at least substantially corresponding demand for cooling output and heating output in the pasteurizer on the other hand. However, this is often not the case and, as a result, in pasteurizers of the prior art with heat pumps, for example the pasteurizers disclosed in DE 10 2013 112 398 A1, it is not possible to operate the heat pump at a constant high output level, or, at the very least, this is only possible subject to considerable restrictions. There is therefore a need to improve operation of pasteurizers of this type as energy-efficiently and cost-effectively as possible.

The object of the present invention was to overcome the existing disadvantages of the prior art and provide an improved device or pasteurization system, and an improved method for pasteurizing foods.

This object is achieved on the one hand by a system and a method according to the invention.

It provides a system for pasteurizing foods packed in closed containers by supplying the containers with a processing liquid.

The system comprises at least one heating zone, at least one pasteurization zone, and at least one cooling zone, as well as a conveyor for transporting the containers in a direction of transport through the heating zone(s), pasteurization zone(s) and cooling zone(s) in succession.

The system also comprises a cold tank and a heat tank for discharging and collecting the processing liquid from at least some of the zones as required.

In this process, the cold tank is connected by a pipe to one side of a cooling heat exchanger. The other side of the cooling heat exchanger is connected by a pipe to a cooling circuit comprising a cold transfer means of a heat pump to transfer cooling energy.

The heat tank is connected by a pipe to one side of a heating heat exchanger. The other side of the heating heat exchanger is connected by a pipe to a heating circuit comprising a heat transfer means of the heat pump to transfer heating energy.

In particular, it is proposed that the cooling circuit should comprise a cold buffer store integrated as a hydraulic switch, said cold buffer store being connected by pipe to an inlet of the cold transfer means of the heat pump in an upper end region, and to an outlet of the cold transfer means in a lower end region, and to an outlet of the cooling heat exchanger in an upper end region, and to an inlet of the cooling heat exchanger in a lower end region.

It is also proposed that the heating circuit should comprise a heat buffer store integrated as a hydraulic switch, said heat buffer store being connected by pipe to an outlet of the heat transfer means of the heat pump in an upper end region, and to an inlet of the heat transfer means in a lower end region, and to an inlet of the heating heat exchanger in an upper end region, and to an outlet of the heating heat exchanger in a lower end region.

These features provide a reservoir in both the cooling circuit and the heating circuit respectively, in which the cooling energy or heating energy generated by the heat pump can be stored via a medium carrying the cooling energy or heating energy respectively. This (temporarily) stored cooling or heating energy can be taken from the cold buffer store or the heat buffer store as required, and supplied to the processing liquid via the cooling heat exchanger or the heating heat exchanger. In particular, this makes it possible to avoid or at least minimize energy shortages and may also prevent the use of non-energy-efficient additional cooling and heating devices at least to as great an extent as possible. The cooling or heating energy taken off as required via the heat exchangers can be reintroduced into the cold buffer store or to the heat buffer store by means of the cold transfer means or the heat transfer means of the heat pump, thus making it possible to operate the pasteurization system in a highly energy-efficient and cost-effective manner.

In particular, this is still possible even if the take-off of cooling and/or heating output or power consumption is subject to considerable fluctuation, for example when the system changes between full operation and temporary standstill. A system standstill may, for example, arise when changing batches, or in the event of a scheduled maintenance operation or similar event. A heat pump with a high energy output may also be used, as a reservoir is provided to hold and temporarily store the cooling energy and heating energy generated by the heat pump. In addition, the supply of fresh water can be minimized, which is advantageous for the process from both an environmental and economic viewpoint.

The side of the cooling heat exchanger through which a coolant passes may also be referred to as the primary side, whereas the side of the cooling heat exchanger through which the processing liquid passes may be referred to as the secondary side. The side of the heating heat exchanger through which a heating medium passes may also be referred to as the primary side, whereas the side of the heating heat exchanger through which the processing liquid passes may be referred to as the secondary side of the heating heat exchanger.

In a development of the system it is conceivable that a recooling means connected by pipe to the cold tank may be provided to cover peak cooling power requirements.

In this case, the recooling means may be formed by a cooling tower or a cold water supply pipe. This creates a safety reserve in the sense of additional emergency cooling, which may also be used in the conceivable event of a potential failure of the heat pump or in the event of the heat pump being maintained, for example.

It is also conceivable that a heating means may be provided in a flow pipe arranged on the outlet side of the heating heat exchanger to provide additional heating for the processing liquid.

In this case, the heating means may be formed by a heat exchanger supplied with steam. This creates a means of further heating the processing liquid if required. The additional heating means, for example the heat exchanger supplied with steam, may, for example, be used if particularly high pasteurization temperatures are required. The additional heating means also provides a safety reserve for applying heating energy to the processing liquid flow pipe.

In another embodiment of the invention, it may be advantageous if the cold buffer store in the cooling circuit has a storage volume of between 0.01 $m^3$ and 3 $m^3$ per 1 kW cooling capacity of the heat pump. This ensures an adequate buffer storage volume to maintain regular operation of the heat pump at a high power level as constantly as possible. This also improves the energy efficiency and cost-effectiveness of the pasteurization system. The cold buffer store preferably has a storage volume of between 0.02 $m^3$ and 1 $m^3$ per 1 kW cooling capacity of the heat pump.

It may also be expedient if the construction height of the cold buffer store is between 0.2 m and 0.4 m per 1 $m^3$ volume of the cold buffer store. The cold buffer store can thus be operated as a stratified tank. In particular, it is possible to constantly supply relatively cold coolant from the lower end region of the cold buffer store to the cooling heat exchanger when operating the pasteurization system. As a result, sufficiently cold coolant is available from the lower end region of the cold buffer store to cool down the processing liquid in the cooling heat exchanger, even after sustained operation of the pasteurization system with a high demand for cooling capacity for a long period of time. The cooling energy taken by extracting cold coolant from the cold buffer store via the cooling heat exchanger can be returned to the cold buffer store by supplying warmer coolant from an upper end region of the cold buffer store, cooling down the extracted coolant via the cold transfer means and supplying the cooled medium to a lower end region. If the cold buffer store is designed as a cylinder, the ratio between the height and the diameter may, for example, be in the region of 1-3 to 1.

In this case it is also possible for at least one temperature sensor to be arranged inside the cold buffer store, at least in the lower end region, in a middle region and in an upper region respectively. This makes it possible to record the temperatures of the coolant in the respective regions of the cold buffer store. This is particularly useful when operating the cold buffer store as a stratified tank. The loading status of the cold buffer store or the extent to which it is loaded with cooling energy can in particular be identified or monitored in this manner Temperature information from the regions inside the buffer store can advantageously be transmitted to a central control device for the pasteurization system for automated and/or manual control purposes.

The heat buffer store in the heating circuit may have a storage volume of between 0.01 $m^3$ and 3 $m^3$ per 1 kW heating capacity of the heat pump. This also ensures an adequate buffer storage volume to maintain regular operation of the heat pump at a high output level as constantly as possible for the purpose of storing the heating energy generated by the heat pump. The heat buffer store preferably has a storage volume of between 0.02 $m^3$ and 1 $m^3$ per 1 kW heating capacity of the heat pump.

In one embodiment, it may be expedient if the construction height of the heat buffer store is between 0.2 m and 0.4 m per 1 $m^3$ volume of the heat buffer store. The heat buffer store can thus also be operated as a stratified tank. If the heat buffer store is designed as a cylinder, the ratio between the height and the diameter may, for example, be in the region of 1-3 to 1.

It is also possible for at least one temperature sensor to be arranged inside the heat buffer store, at least in the lower end region, in a middle region and in an upper end region respectively. Similarly, it is possible to record the temperatures of the heating medium in the respective regions of the heat buffer store, and loading of the heat buffer store with heating energy can be identified and monitored.

For adjustment purposes, it is also conceivable for the cooling circuit to comprise a bypass line between the cold transfer means and the cold buffer store, at least one flow adjustment device being assigned to said bypass line. This bypass line may be used in the cooling circuit for control purposes in conjunction with the flow adjustment device, for example for specifically adjusting a coolant temperature level.

However, a bypass line can also be provided in the heating circuit between the heat transfer means and the heat buffer store, at least one flow adjustment device being assigned to said bypass line. This bypass line can also be used in conjunction with the flow adjustment device for control purposes.

With a view to energy efficiency and controlling cooling output and temperature, a development of the invention in which respective pumps with adjustable flow can be arranged in the cooling circuit, each intended to supply a coolant to the cooling heat exchanger from the cold buffer store, and to supply the coolant to the cold transfer means from the cold buffer store, may also be expedient. By adjusting the flow of the cooling medium via the cold transfer means or the cooling heat exchanger respectively, both the provision and supply of cooling energy to the processing liquid can be controlled or carried out specifically by control technology, and the temperature level of the coolant can be adjusted specifically. For example, by restricting or reducing the flow rate or pump rate via the cold transfer means, the coolant can be cooled down to lower temperatures.

Another embodiment may also be expedient in which respective pumps with adjustable flow are arranged in the heating circuit, each intended to supply a heating medium to the heating heat exchanger from the heat buffer store, and to supply the heating medium to the heat transfer means from the heat buffer store. Once again, by adjusting the flow of the coolant via the cold transfer means or the cooling heat exchanger respectively, both the provision and supply of cooling energy to the processing liquid can be controlled or carried out specifically by control technology, and the temperature level of the coolant can also be adjusted specifically.

However, the object of the invention can also be autonomously and independently achieved by a method for pasteurizing foods packed in closed containers, wherein the method may specifically be implemented by a system with the specified features.

The method entails transporting the containers by means of a conveyor in a direction of transport through at least one heating zone, at least one pasteurization zone and at least one cooling zone in succession, and supplying the containers in the respective zones with an appropriately tempered processing liquid.

In this case, processing liquid is supplied to a respective zone at least partially from another zone and/or from the same zone and/or from a cold tank and/or via a flow pipe.

Some of the processing liquid is taken from the cold tank, cooled via a cooling heat exchanger, and returned to the cold tank, cooling energy being transferred to the cooling heat exchanger from a cooling circuit comprising a cold transfer means of a heat pump.

The heating energy generated in a heating circuit comprising a heat transfer means of the heat pump is used to increase the temperature of the processing liquid in the flow pipe via a heating heat exchanger as required.

In particular, it is proposed that the cooling energy generated in the cold transfer means is introduced into a lower end region of a cold buffer store integrated as a hydraulic switch in the cooling circuit via a coolant passed through the cold transfer means and cooled in this process, and coolant is returned from an upper end region of the cold buffer store to the cold transfer means.

The heating energy generated in the heat transfer means is introduced into an upper end region of a heat buffer store integrated as a hydraulic switch in the heating circuit via a heating medium passed through the heat transfer means and heated in this process, and heating medium is returned from an upper end region of the heat buffer store to the heat transfer means.

By introducing the cooling energy generated in the cold transfer means by the heat pump into the lower end region of the cold buffer store, the cooling energy can be temporarily stored in the cold buffer store. On the other hand, the heating energy generated in the heat transfer means of the heat pump can be stored temporarily in the heat buffer store. In this case, the cooling or heating energy can be taken from the cold buffer store or the heat buffer store as required and supplied to the cooling heat exchanger or the heating heat exchanger via the coolant or the heating medium respectively. The cooling or heating energy taken off as required by the two heat exchangers can be readmitted to the cold buffer store or to the heat buffer store via the coolant conveyed by the cold transfer means or via the heating medium conveyed by the heat transfer means of the heat pump, thus making it possible to operate the pasteurization system in a highly energy-efficient and cost-effective manner.

In another development of the invention the coolant may be supplied from the lower end region of the cold buffer store to the cooling heat exchanger and returned to the upper end region of the cold buffer store after passing through the cooling heat exchanger. As a result, particularly cold cooling medium can be supplied to the cooling heat exchanger, causing the processing liquid, which flows through the cooling heat exchanger as a separate material from the coolant, to be cooled efficiently. The processing liquid and the cooling medium are in this case preferably passed through the cooling heat exchanger using the countercurrent principle.

It is also possible for the heating medium to be supplied to the heating heat exchanger from an upper end region of the heat buffer store and returned to a lower end region of the heat buffer store after passing through the heating heat exchanger. As a result, heating medium at a particularly high temperature can be supplied to the heating heat exchanger, causing the processing liquid, which flows through the heating heat exchanger as a separate material from the heating medium, to be heated efficiently. The processing liquid and the heating medium are in turn preferably passed through the heating heat exchanger using the countercurrent principle.

In an embodiment of the invention, it is possible for the processing liquid in the cold tank to be additionally cooled as required by means of a recooling means particularly in the form of a cooling tower or cold water supply pipe. Peak cooling power requirements can thus be covered or the processing liquid can still be cooled even if the heat pump is at a standstill.

It may also be expedient if the temperatures of the coolant in the cold buffer store and the temperatures of the heating medium in the heat buffer store are recorded by temperature sensors arranged at least in a lower end region, in a middle region, and in an upper end region of the cold buffer store and the heat buffer store respectively. This is particularly useful if the cold buffer store or the heat buffer store are operated as stratified tanks with temperature stratification of the coolant or heating medium respectively. Temperature information from the respective regions inside the cold buffer store and the heat buffer store can advantageously be transmitted to a central control device for the pasteurization system for automated and/or manual control purposes, especially to monitor the loading status.

In an advantageous embodiment of the invention, it is possible for a respective quantity of coolant supplied to the cold buffer store and taken from the cold buffer store to be supplied to the cooling heat exchanger to be adjusted to the respective cooling demand and/or a necessary temperature level of the coolant by means of pumps with adjustable flow. In the case of a high cooling demand, the supply of coolant from the cold buffer store to the cooling heat exchanger can thus be increased, for example. The quantity of coolant conveyed by the cold transfer means can, for example, be reduced to cool down the coolant in the cold transfer means to lower temperatures in order to ensure lower temperatures of the coolant in the cold buffer store.

It may also be expedient if the containers in a cooling zone arranged at the end along the direction of transport are cooled to a pre-defined target temperature by means of the processing liquid, and the temperature of the coolant in the lower end region of the cold buffer store is adjusted to a temperature level below this target temperature. This is particularly expedient when pasteurizing foods with sensitive contents to prevent any loss of taste, nutritional value or change in consistency of the foods.

It is also conceivable for at least some of the coolant to be returned immediately to the cold transfer means via a bypass line after being discharged from the cold transfer means when a temperature of the coolant in the lower end region of the cold buffer store is recorded as being above the temperature of the processing liquid in the cold tank and/or above a threshold temperature which can be pre-defined. As a result, the coolant can be brought to an appropriate or expedient temperature level for cooling the processing liquid in the cooling heat exchanger before being admitted to the lower end region of the cold buffer store.

However, it can also be expedient if the coolant is only supplied to the cooling heat exchanger from the lower end region of the cold buffer store if a minimum temperature level of the coolant has been set below a threshold temperature which can be predefined in the lower end region of the cold buffer store. This makes it possible to prevent the coolant being supplied to the cooling heat exchanger at an unsuitable temperature or an excessively high temperature for cooling down the processing liquid.

Finally, it is possible to have a process control system in which an inert gas in liquid form is added to the containers before these enter a heating zone arranged at the start in the direction of transport. For example, liquid carbon dioxide or liquid nitrogen may be admitted to the containers. As a result, the food inside the containers can also be protected during the pasteurization process and thereafter. In particular, undesirable metabolic processes involving oxidization due to microorganisms can be prevented in this manner. By supplying liquid inert gas, the foods or containers can be cooled before entering the pasteurization system, which can affect the energy required during the pasteurization process. However, by temporary storage of cooling and heating energy in the cold buffer store or the heat buffer store, it is possible to control the process in a seamless and energy-efficient manner.

To facilitate understanding of the invention, it is explained below in greater detail with the aid of the following FIGURE.

This shows a highly simplified schematic representation of the following:

FIG. 1 a flowchart of a system or a flow diagram for pasteurizing foods in containers.

By way of an introduction, it is noted that the same components are provided with the same reference numerals or the same component names in embodiments with different descriptions, which means that the disclosures contained in the description as a whole can be transferred accordingly to the same components with the same reference numerals or the same component names. Selected location information in the description, such as, for example, above, below, at the side of, etc., also refers to the FIGURE immediately described and illustrated, and this location information should be transferred accordingly to the new location if this location changes.

FIG. 1 is a schematic representation showing an embodiment of a system 1 for pasteurizing foods packed in closed containers 2. The system 1 shown in FIG. 1 is designed as a so-called tunnel pasteurizer in which the containers 2 are transported by means of a conveyor 3, for example a conveyor belt in a direction of transport 4 through a number of successive zones. In the embodiment shown in FIG. 1, two heating zones 5, 6 are first provided in the direction of transport, followed by two pasteurization zones 7, 8, and finally two cooling zones 9, 10.

More or fewer zones may of course also be provided than are shown in the embodiment according to FIG. 1 depending on the requirements or purpose of a pasteurization system. It is also possible to provide additional treatment zones. For example, a zone to dry the outside of the containers 2 may also be provided after the cooling zone 10 arranged at the end in the direction of transport 4. Such additional treatment zones are not illustrated in FIG. 1 for reasons of clarity.

It is possible to supply the containers 2 with a processing liquid 11 to treat or pasteurize the foods. In the embodiment shown in FIG. 1, sprinkling devices 12 are arranged for this purpose on the inlet side of each zone 5, 6, 7, 8, 9, 10, said sprinkling devices being used to distribute or supply the processing liquid 11 on or over the outside of the closed containers 2. The sprinkling devices 12 may, for example, be formed by a plurality of spray nozzles, which may be arranged in an upper and/or side region of each zone 5, 6, 7, 8, 9, 10, for example. The processing liquid may be admitted to the respective zone 5, 6, 7, 8, 9, 10 via the sprinkling devices 12 at a different temperature level in each case or at a temperature level set for each zone, as is explained in more detail below. The processing liquid 11 may be supplied to the sprinkling devices 12 in zones 5, 6, 7, 8, 9, 10 in this process via a pump in each case, especially a circulation pump 13.

It is, for example, conceivable that the processing liquid 11 may be supplied to the heating zone 5 at a temperature of approx. 35° C. and to the heating zone 6 at a temperature of approx. 55° C. to allow the food in the containers to be preheated as gently as possible. In order to pasteurize the foods in the containers, the processing liquid 11 may be supplied to the pasteurization zones 7, 8 at a temperature of approximately 85° C. so as to heat the containers 2 or the food contained in said containers to an effective pasteurization temperature and to keep them at this pasteurization temperature for a sufficiently long period. In order to specifically cool down the containers 2 or the foods, it is possible to admit the processing liquid 11 to the cooling zone 9 at a temperature of approximately 50° C. and to admit it to the cooling zone 10 at a temperature of approximately 30° C.

These temperature values of the processing liquid 11 specified for each zone 5, 6, 7, 8, 9, 10, by way of example, may of course be varied in line with demand. The type or composition of the foods to be pasteurized may play an important role in this process. For example, the pasteurization temperature may need to be higher or lower than 85° C. depending on the composition of the foods. Furthermore, it may be necessary to cool the food more quickly after pasteurization, or to cool the food to a lower temperature level, especially in the case of temperature-sensitive foods, for example. This applies in particular to foods with sensitive contents, for example foods containing sugar. In such cases, the processing liquid 11 may be supplied to the cooling zones 9, 10 at a lower temperature level than specified above, for example at a temperature of 45° C. for cooling zone 9 or 25° C. for cooling zone 10.

After sprinkling a respective zone 5, 6, 7, 8, 9, 10, the processing liquid 11 may be collected in a lower collection region 14 of zones 5, 6, 7, 8, 9, 10 and discharged from the zones 5, 6, 7, 8, 9, 10 for use elsewhere. To this end, on the one hand the inlet or suction sides of the circulation pumps 13 may be connected by pipe to the zones 5, 6, 7, 8, 9, 10 or their collection regions 14 so as to supply at least some of the processing liquid 11 from the collection regions 14 immediately back to one of the zones 5, 6, 7, 8, 9, 10. As in the embodiment shown in FIG. 1, it may in this case be expedient to connect the circulation pump 13, the inlet side of which is connected by pipe to the collection region 14 of the heating zones 5, to the sprinkling device 12 for cooling zone 10 on its outlet side. This may primarily be expedient because the processing liquid 11 is cooled down in the heating zone 5 by the heat absorbed from the containers 2 or the foods, and after passing through the heating zone 5, said liquid displays a suitable temperature level to cool the containers 2 in the cooling zone 10.

For the same reasons, it may be useful to supply the processing liquid 11 from the collection region 14 of the cooling zone 10 to the sprinkling device 12 for the heating zone 5, as is illustrated schematically in the embodiment of the pasteurization system 1 in FIG. 1. In addition, it is also possible to have a reciprocal supply of processing liquid 11 from the heating zone 6 to the cooling zone 9 and vice versa.

As shown in the embodiment in FIG. 1, it is possible for the circulation pumps 13 assigned to pasteurization zones 7, 8 to at least partially return the processing liquid 11 from the collection region of zone 7 or zone 8 respectively to the sprinkling devices 12 for the corresponding zone 7 or zone 8 respectively. In other words, it is possible for at least some of the processing liquid 11 to be conveyed in a circuit around the pasteurization zone 7 and around the pasteurization zone 8.

In addition, it is possible for at least some of the processing liquid 11 arising in the collection regions 14 to be supplied to collection containers instead of being pumped back into a treatment zone 5, 6, 7, 8, 9, 10. To this end, according to the embodiment shown in FIG. 1, a cold tank 15 is arranged on the one hand, this being provided to collect processing liquid 11 at a low temperature level. Processing liquid 11 from collection regions 14, in which the processing liquid 11 has a relatively low temperature, may in particular be supplied to the cold tank 15. In the embodiment shown in FIG. 1, the cold tank 15 is therefore connected by pipe to the collection region 14 for the heating zone 5 and the collection region 14 for the cooling zone 10.

A heat tank 16 is also arranged in the embodiment shown in FIG. 1, said heat tank being provided to collect and temporarily store processing liquid at a high temperature level. It may therefore be useful to supply processing liquid 11 from the collection regions 14 for the pasteurization zones 7, 8 to this heat tank 16, as is also illustrated schematically in FIG. 1.

Processing liquid 11 at a low temperature level can be added from the cold tank 15 to the sprinkling devices 12 for zones 5, 6, 7, 8, 9, 10 by means of the circulation pumps 13 and the dosing devices 17 arranged on the inlet side of the circulation pumps 13 in the embodiment illustrated in FIG. 1. In addition, processing liquid 11 at at least pasteurization temperature or a higher temperature can also be added from a flow pipe 18 to the sprinkling devices 12 for zones 5, 6, 7, 8, 9, 10 by means of additional dosing devices 17. The dosing devices 17 may be formed by flow adjustment valves in this case, for example. As a result, processing liquid 11 at a temperature that can be defined or set specifically can be supplied to each treatment zone 5, 6, 7, 8, 9, 10.

Of course, other alternative solutions are also fundamentally conceivable as a means of conveying the processing liquid 11 through the system 1 or the respective zones 5, 6, 7, 8, 9, 10. For example, depending on the purpose of the pasteurization system 1, it may no longer be necessary to mix cold processing liquid from the cold tank 15 for at least some treatment zones, with the result that it may not be necessary to connect the inlet side of each of the circulation pumps 13 to the cold tank 15 by pipe. It is also conceivable that at least some of the circulation pumps 13 may not be connected by pipe to the flow pipe 18 conveying processing liquid 11 at at least pasteurization temperature.

As is also shown schematically in FIG. 1, the cold tank 15 is connected by pipe to one side of a cooling heat exchanger 19. The other side of the cooling heat exchanger 19 is connected by pipe to a cooling circuit 20 of a cold transfer means 21 of a heat pump 22 to transfer cooling energy to the processing liquid 11. When the system is operating, the cooling circuit 20 contains a coolant 23 which may in particular be formed substantially by water. In some cases, antifreeze or other additives may be added to the coolant 23 or water. The processing liquid 11 and the coolant 23 are passed through the cooling heat exchanger 19 as separate materials, preferably using the countercurrent principle. Some of the processing liquid 11 can thus be taken from the cold tank 15, cooled down via the cooling heat exchanger 19, and returned to the cold tank 15 by transferring the cooling energy provided in the cold transfer means 21 to the processing liquid in the cooling heat exchanger 19.

In this process it is important that the cooling circuit 20 should comprise a cold buffer store 24 integrated as a hydraulic switch, said cold buffer store being connected by pipe to an inlet of the cold transfer means 21 of the heat pump 22 in an upper end region, and to an outlet of the cold transfer means 21 in a lower end region, and to an outlet of the cooling heat exchanger 19 in an upper end region, and to an inlet of the cooling heat exchanger 19 in a lower end region. It is thus possible to apply the cooling energy generated in the cold transfer means 21 via the coolant 23 conveyed through the cold transfer means 21 to a lower end region of the cold buffer store 24, and to return the coolant 23 from an upper end region of the cold buffer store 24 to the cold transfer means 21 independently of extraction of coolant 23 from the cold buffer store 24 to supply the cooling heat exchanger 19. In other words, the cold buffer store 24 provides a means of disconnecting cooling power consumption in the cooling heat exchanger 19 and the cooling energy generated in the cold transfer means 21. Any excess cooling energy generated in the cold transfer means 21 of the heat pump 22 can be stored temporarily in the cold buffer store 24 for subsequent use or consumption in this process.

In this case it may be advantageous if the cold buffer store 24 has a storage volume of between 0.01 m$^3$ and 3 m$^3$ per 1 kW cooling capacity of the heat pump 22. The cold buffer store preferably has a storage volume of between 0.02 m$^3$ and 1 m$^3$ per 1 kW cooling capacity of the heat pump. It may also be expedient if the construction height of the cold buffer store 24 is between 0.2 m and 0.4 m per 1 m$^3$ volume of the cold buffer store 24. If the cold buffer store is designed as a cylinder, the ratio between the height and the diameter may, for example, be in the region of 1-3 to 1. By arranging the cold buffer store 24 in this manner, it is, in particular, possible to maintain adequate temperature stratification in the cold buffer store 24 so that the cold buffer store 24 can be operated as a stratified tank. Hot liquids, for example hot water, have a lower density than the corresponding cold liquids, with the result that cold coolant 23 collects in the lower end region of the cold buffer store 24.

This makes it possible for relatively cold coolant 23 to be supplied to the cooling heat exchanger 19 from the lower end region of the cold buffer store 24 when operating the system 1, and the resulting heated coolant 23 is returned to the upper end region of the cold buffer store 24 after passing through the cooling heat exchanger 19. In respect of the cold transfer means, relatively warm coolant can in turn be taken continuously from the upper end region of the cold buffer store 24, cooled via the cold transfer means 21, and admitted back to the lower end region of the cold buffer store 24 as relatively cold coolant 23. As a result, sufficiently cold coolant 23 is available from the lower end region of the cold buffer store 24 to cool down the processing liquid 11 in the cooling heat exchanger 19, even after sustained operation of the pasteurization system with a high cooling capacity demand over a long period of time. If there is a low take-up of cooling power in the system 1, for example when changing the batches of containers 1 or foods, thus leading to empty zones 5, 6, 7, 8, 9, 10, the cold buffer store 24 may be loaded with cooling energy or with coolant 23 cooled via the cold transfer means 21.

In rare cases, it may also be expedient to supply the coolant to the cooling heat exchanger from regions other than the lower end region of the cold buffer store, especially if a higher temperature level of the coolant is expedient. Additional pipe connections between the cold buffer store and the cooling heat exchanger would need to be provided for this purpose. This is not shown in FIG. 1 for reasons of clarity.

To allow automated control or adjustment of the provision of cooling energy through the cooling circuit 20 or in the cold buffer store 24, at least one temperature sensor 25 may be arranged at least in the lower end region, in a middle region, and in an upper end region inside the cold buffer store 24 to record the temperatures of the coolant 23 in the respective regions of the cold buffer store 24 in each case. The cooling circuit 20 may also comprise a bypass line 26 between the cold transfer means 21 and the cold buffer store 24, at least one flow adjustment device 27 being assigned to said bypass line. In the embodiment shown in FIG. 1, the flow adjustment device 27 is formed by an adjustable three-way valve, by means of which the flow rates of the coolant 23 in the circuit around the cold transfer means 21 or the flow rates in the cold buffer store 24 can be adjusted continuously for the purpose of loading said store with coolant 23.

It is also conceivable that respective pumps 28 with adjustable flow may be arranged in the cooling circuit 20, each intended to supply the coolant 23 to the cooling heat exchanger 19 from the cold buffer store 24, and to supply the coolant 23 to the cold transfer means 21 from the cold buffer store 24.

The temperature sensors 25, the flow adjustment device 27, the pumps 28, and the heat pump 22 itself may in this case be connected by electrical means or by data technology to a control device not illustrated in FIG. 1, for example a so-called PLC controller. By programming such a PLC controller accordingly, the flow adjustment device 27, the pumps 28, and the heat pump 22, or their lower-level or internal controllers can be controlled automatically in line with the respective requirements.

It is thus possible for a respective quantity of coolant 23 supplied to the cold buffer store 24 and taken from the cold buffer store 24 to be supplied to the cooling heat exchanger 19 to be adjusted to the respective cooling demand and/or a necessary temperature level of the coolant 23 by means of pumps 28 with adjustable flow. In this process, a smaller quantity of coolant 23 may, for example, be conveyed via the cold transfer means 21 to achieve a lower temperature level of the coolant 23. By restricting the flow rate of the pump 28 conveying the coolant 23 between the cold transfer means 21 and the cold buffer store 24, it is possible to make the coolant 23 remain in the cold transfer means 21 for a longer time. As a result, the coolant can take up more cooling energy in the cold transfer means 21, and is thus cooled to a greater extent or brought to a lower temperature level.

A demand for particularly cold coolant 23 may, for example, arise if containers 2 or the foods in the containers 2 need to be cooled down by the processing liquid 11 to a pre-defined low target temperature in a cooling zone 10 located at the end along the direction of transport 4. For this purpose, the temperature of the coolant 23 in the lower end region of the cold buffer store 24 may be adjusted to a temperature level lower than this target temperature.

It is also conceivable for at least some of the coolant 23 to be returned immediately to the cold transfer means 21 via the bypass line 26 after being discharged from the cold transfer means 21 when a temperature of the coolant 23 in the lower end region of the cold buffer store 24 is recorded as being above a temperature of the processing liquid 11 in the cold tank 15 and/or above a threshold temperature which has been or can be pre-defined. A temperature sensor should of course also be provided for this purpose to measure the temperature in the cold tank 15.

However, it is also possible to only supply the coolant 23 to the cooling heat exchanger 19 from the lower end region of the cold buffer store 24 if a minimum temperature level of the coolant 23 has been set below a threshold temperature which has been or can be pre-defined in the lower end region of the cold buffer store 24.

In principle, problem-free and highly-efficient operation of the system 1 in energy terms, or highly efficient and environmentally friendly process control can be provided as a result of the PLC-controlled heat pump 22, flow adjustment device 27, and the pumps 28 in conjunction with the cold buffer store 24, which is integrated as a hydraulic switch and designed accordingly. In order to cover peak cooling power requirements, a recooling means, which may be designed as a cooling tower 29 or a cold water supply pipe 39, as is also illustrated in FIG. 1, and which is connected by pipe to the cold tank 15, may be provided as a safety reserve. As shown in FIG. 1, in this case processing liquid 11 may be taken from the cold tank 15 as required, passed through the cooling tower 29, for example, and then returned to the cold tank 15 so that the processing liquid 11 in the cold tank 15 can also be additionally cooled as required, particularly to cover peak cooling power requirements especially by means of a recooling means designed as a cooling tower 29 or cold water supply pipe 39. In order to compensate for the entire liquid quantity in the system 1, the cold tank 15 and/or the heat tank 16 may have a discharge 40, for example.

As is also shown in FIG. 1, the heat tank 16 is connected by pipe to one side of a heating heat exchanger 30. The other side of the heating heat exchanger 30 is connected by pipe to a heating circuit 31 comprising a heat transfer means 32 of the heat pump 22 to transfer heating energy. The heating circuit 31 contains a heating medium 33 which may in turn be formed substantially by water. In some cases, antifreeze or other additives may be added to the heating medium 33 or water. The processing liquid 11 and the heating medium 33 are passed through the heating heat exchanger 30 as separate materials, preferably using the countercurrent principle.

The outlet of the heating heat exchanger 30 for the processing liquid 11, which is illustrated on the upper right-hand side of the heating heat exchanger 30 in FIG. 1, leads into the flow pipe 18 described above, from which heated processing liquid 11 can be added or supplied to the zones 5, 6, 7, 8, 9, 10 by the dosing devices 17 as required. This makes it possible to use the heating energy or waste heat generated in the process of cooling the coolant 23 in the cold transfer means 21 by the heat pump 22 in the heat transfer means 32 to increase the temperature of the processing liquid 11 in the flow pipe 18 by means of a heating heat exchanger 30 as required.

As described above, processing liquid 11 at at least pasteurization temperature is supplied in particular to the pasteurization zones 7, 8 via the flow pipe 18. To additionally heat the processing liquid 11 to at least pasteurization temperature or a higher temperature in the flow pipe 18, a heating means may be provided in the flow pipe 18 arranged on the outlet side of the heating heat exchanger 30 to additionally heat the processing liquid 11. In this case, the heating means may for example be formed by a heat exchanger 34 supplied with steam.

It is also possible for processing liquid 11 from the heat tank 16 to be added to the flow pipe 18, or for processing liquid 11 to be supplied to the heat tank 16 from the flow pipe 18, as illustrated schematically in FIG. 1.

In the heating circuit 31 it is also important that it comprises a heat buffer store 35 integrated as a hydraulic switch, said heat buffer store being connected by pipe to an outlet of the heat transfer means 32 of the heat pump 22 in an upper end region, and to an inlet of the heat transfer means 32 in a lower end region, and to an inlet of the heating heat exchanger 30 in an upper end region, and to an outlet of the heating heat exchanger 30 in a lower end region. It is thus possible to apply the heating energy generated in the heat transfer means 32 or the waste heat via the heating medium 33 conveyed through the heat transfer means 32 to an upper end region of the heat buffer store 35, and to return the heating medium 33 from a lower end region of the heat buffer store 35 to the heat transfer means 32 independently of extraction of heating medium 33 from the heat buffer store 35 to supply the heating heat exchanger 30.

Relatively hot heating medium 33 may advantageously be supplied to the heating heat exchanger 30 from the upper end region of the heat buffer store 35, and returned to a lower end region of the heat buffer store 35 after passing through the heating heat exchanger 30 and discharging its heating energy accordingly. The heat buffer store 35 therefore in turn provides a means of disconnecting heating power consumption in the heating heat exchanger 30 and the heating energy generated in the heat transfer means 32. Any excess heating energy generated in the heat transfer means 32 of the heat pump 22 can thus be stored temporarily in the heat buffer store 35 for subsequent use or consumption.

An advantageous design of the heat buffer store 35 may have a storage volume of between 0.01 m$^3$ and 3 m$^3$ per 1 kW heating capacity of the heat pump 22. The heat buffer store preferably has a storage volume of between 0.02 m$^3$ and 1 m$^3$ per 1 kW heating capacity of the heat pump. It may also be expedient if the construction height of the heat buffer store 35 is between 0.2 m and 0.4 m per 1 m$^3$ volume of the heat buffer store 35. If the heat buffer store is designed as a cylinder, the ratio between the height and the diameter may, for example, be in the region of 1-3 to 1. As a result, hot heating medium 33 in turn collects in the upper end region of the heat buffer store 35, and this heating medium 33 can advantageously be supplied to the heating heat exchanger 30 from the upper end region of the heat buffer store 35 at a higher temperature than in the lower end region of the heat buffer store 35, as is also clearly visible in FIG. 1.

At least one temperature sensor 25 may also be arranged inside the heat buffer store 35 to allow automated control or adjustment of the provision of heating energy in the heating circuit 3, at least in the lower end region, in a middle region, and in an upper end region of the heat buffer store 35 in each case. As a result, the temperatures of the heating medium 33 in the respective regions inside the heat buffer store 35 can be recorded.

It is also possible for the heating circuit 31 to comprise a bypass line 36 between the heat transfer means 32 and the heat buffer store 35, at least one flow adjustment device 37 being assigned to said bypass line. The flow adjustment device 37 may in turn be formed by an adjustable three-way valve, by means of which the flow rates of the heating medium 23 in the circuit around the heat transfer means 32 or the flow rates of the heating medium 33 for the purpose of loading the heat buffer store 35 can be adjusted continuously.

It is also conceivable that respective pumps 38 with adjustable flow may also be arranged in the heating circuit 31, each intended to supply the heating medium 33 to the heating heat exchanger 30 from the heat buffer store 35 and to supply the heating medium 33 to the heat transfer means 32 from the heat buffer store 35. The temperature sensors 25, the flow adjustment device 37, and the pumps 38 can in turn be connected to the PLC controller described above by electrical means or by data technology.

The heat pump 22 illustrated schematically in FIG. 1 may in principle be formed by any suitable type of heat pump, in other words by a so-called compression heat pump, for example, or an absorption heat pump may be used by way of example. The cooling energy generated by the heat pump 22 may be transferred to the coolant 23 via or in an appropriate cold transfer means 21 in the form of a heat exchanger depending on the type of heat pump used in this case. The heating energy generated by the heat pump 22 may be transferred to the heating medium 33 via or in appropriate heat transfer means 32 in the form of a heat exchanger depending on the type of heat pump used in this case. A compression heat pump is preferably used, said heat pump being able to be operated by supplying a compressor with electrical energy. If a compression heat pump 22 is used, the cold transfer means 21 may be formed by the evaporator or evaporators of the heat pump 22, and the heat transfer means 32 may be formed by the condenser or condensers of the heat pump 22.

The features and measures allow the system 1 to operate in an energy-efficient manner. In particular, by the arrangement of the cold buffer store 24 and the heat buffer store 35, heating and cooling energy can be provided by the heat pump and stored temporarily in a highly efficient manner. This makes it possible to operate the heat pump 22 in a very energy-efficient manner, because it is not dependent on fluctuations in the demand for cooling and heating energy. Such fluctuations often arise in pasteurization systems, for example when the system is temporarily shut down for maintenance or similar operations, or when the system is at a standstill due to changing batches. In particular, different operating conditions, especially different temperatures for the processing liquid 11 for supplying to the zones 5, 6, 7, 8, 9, 10, may also be required when switching operation to different food batches and/or containers. For example, it is possible for an inert gas in liquid form to be added to the containers 2 before they enter a heating zone 5 arranged at the start in the direction of transport 4 as a protective gas for the food contained in the container 2. This may lead to a reduction in the temperature of the foods or containers 2 shortly before entering the system 1, thus making higher heating outputs necessary in such cases, for example. However, fluctuations in the demand for cooling and heating output are buffered by the cold buffer store 24 and the heat buffer store 35, thus permitting highly efficient process control despite these fluctuations.

Finally, for the sake of completeness, it should also be noted that both the cold buffer store 24 and the heat buffer store 35, and also their supply and discharge pipes, are preferably designed to be thermally insulated, or clad in corresponding insulation material, to minimize losses of cooling or heating energy. The same measures may also be expedient for other components in the cooling circuit 20 and the heating circuit 31, especially the cooling heat exchanger 19 and the heating heat exchanger 30.

The embodiments illustrate possible variations of the system or method, with the proviso that the invention is not restricted to the variations of these embodiments specifically described, but that various combinations of the individual variations of the embodiments are also possible, and these possible variations lie within the abilities of persons skilled in the art in this technical field on the grounds of teaching in relation to technical possibilities posed by the present invention.

The scope of protection is defined by the claims. However, the description and the drawings should be used to construct the claims. Individual features or combinations of features from the different illustrated and described embodiments may represent independent innovative solutions. The object forming the basis for the independent innovative solutions may be taken from the description.

All information relating to ranges of values in the description of the invention should be understood as including any and all partial regions of these ranges, e.g. specifying 1 to 10 should be understood to mean that all partial ranges from the lower limit of 1 and the upper limit of 10 are included, i.e. all partial ranges begin with a lower limit of 1 or higher and end with an upper limit of 10 or lower, e.g. 1 to 1.7, or 3.2 to 8.1, or 5.5 to 10.

Finally, as a matter of form, it should be noted that components are sometimes not shown to scale and/or may be enlarged and/or reduced in size to facilitate understanding of the structure of system 1.

LIST OF REFERENCE NUMERALS

1 System
2 Container
3 Conveyor
4 Direction of transport
5 Heating zone
6 Heating zone
7 Pasteurization zone
8 Pasteurization zone
9 Cooling zone
10 Cooling zone
11 Processing liquid
12 Sprinkling device
13 Circulation pump
14 Collection region
15 Cold tank
16 Heat tank
17 Dosing device
18 Flow pipe
19 Cooling heat exchanger
20 Cooling circuit
21 Cold transfer means
22 Heat pump
23 Coolant
24 Cold buffer store
25 Temperature sensor
26 Bypass pipe
27 Flow adjustment device
28 Pump
29 Cooling tower
30 Heating heat exchanger
31 Heating circuit
32 Heat transfer means
33 Heating medium
34 Heat exchanger
35 Heat buffer store
36 Bypass line
37 Flow adjustment device
38 Pump
39 Cold water supply pipe
40 Discharge

The invention claimed is:

1. A system for pasteurizing foods packed in closed containers by supplying the closed containers with a processing liquid, comprising
a supply device configured to supply the processing liquid on or over an exterior of the closed containers;
at least one heating zone;
at least one pasteurization zone;
at least one cooling zone;
a conveyor configured to transport the closed containers in a direction of transport through the at least one heating zone, the at least one pasteurization zone, and the at least one cooling zone in succession;
a cold tank and a heat tank configured to collect the processing liquid from at least one of the at least one heating zone, the at least one pasteurization zone, and the at least one cooling zone as required,
the cold tank being connected by pipe to one side of a cooling heat exchanger, the other side of which is connected by pipe to a cooling circuit comprising a heat pump for the purpose of transferring cooling energy, and
the heat tank being connected by pipe to one side of a heating heat exchanger, the other side of which is connected by pipe to a heating circuit comprising the heat pump for the purpose of transferring heating energy;
wherein
the cooling circuit comprises a cold buffer store integrated as a hydraulic switch, said cold buffer store being connected by pipe to an inlet of the heat pump in an upper end region, and being connected by pipe to an outlet of the heat pump in a lower end region, and also to an outlet of the cooling heat exchanger in an upper end region, and to an inlet of the cooling heat exchanger in a lower end region;
the heating circuit comprises a heat buffer store integrated as a hydraulic switch, said heat buffer store being connected by pipe to an outlet of the heat pump in an upper end region, and being connected by pipe to an inlet of the heat pump in a lower end region, and also to an inlet of the heating heat exchanger in an upper end region, and to an outlet of the heating heat exchanger in a lower end region; and
wherein a recooling means formed by a cooling tower or a cold water supply pipe and connected by pipe to the cold tank is provided to cover peak cooling power requirements.

2. The system according to claim 1, wherein a heating means is provided in a flow pipe arranged on the outlet side of the heating heat exchanger to provide additional heating for the processing liquid.

3. The system according to claim 2, wherein the heating means is formed by a heat exchanger supplied with steam.

4. The system according to claim 1, wherein the cold buffer store has a storage volume of between 0.01 m³ and 3 m³ per 1 kW cooling capacity of the heat pump.

5. The system according to claim 4, wherein a construction height of the cold buffer store is between 0.2 m and 0.4 m per 1 m$^3$ volume of the cold buffer store.

6. The system according to claim 5, wherein at least one temperature sensor is arranged inside the cold buffer store, at least in the lower end region, in a middle region, and in an upper end region respectively.

7. The system according to claim 1, wherein the heat buffer store has a storage volume of between 0.01 m$^3$ and 3 m$^3$ per 1 kW heating capacity of the heat pump.

8. The system according to claim 7, wherein a construction height of the heat buffer store is between 0.2 m and 0.4 m per 1 m$^3$ volume of the heat buffer store.

9. The system according to claim 8, wherein at least one temperature sensor is arranged inside the heat buffer store, at least in the lower end region, in a middle region, and in an upper end region respectively.

10. The system according to claim 1, wherein the cooling circuit comprises a bypass line between the heat pump and the cold buffer store, at least one flow adjustment device being assigned to said bypass line.

11. The system according to claim 1, wherein the heating circuit comprises a bypass line between the heat pump and the heat buffer store, at least one flow adjustment device being assigned to said bypass line.

12. The system according to claim 1, wherein respective pumps with adjustable flow are arranged in the cooling circuit, each intended to supply a coolant to the cooling heat exchanger from the cold buffer store, and to supply the coolant to the heat pump from the cold buffer store.

13. The system according to claim 1, wherein respective pumps with adjustable flow are arranged in the heating circuit, each intended to supply a heating medium to the heating heat exchanger from the heat buffer store, and to supply the heating medium to the heat pump from the heat buffer store.

14. A method for pasteurizing foods packed in closed containers,
comprising:
providing a system comprising
a supply device configured to supply a processing liquid on or over an exterior of the closed containers;
at least one heating zone;
at least one pasteurization zone;
at least one cooling zone;
a conveyor configured to transport the closed containers in a direction of transport through the at least one heating zone, the at least one pasteurization zone, and the at least one cooling zone in succession;
a cold tank and a heat tank configured to collect the processing liquid from at least one of the at least one heating zone, the at least one pasteurization zone, and the at least one cooling zone as required,
the cold tank being connected by pipe to one side of a cooling heat exchanger, the other side of which is connected by pipe to a cooling circuit comprising a heat pump for the purpose of transferring cooling energy, and
the heat tank being connected by pipe to one side of a heating heat exchanger, the other side of which is connected by pipe to a heating circuit comprising the heat pump for the purpose of transferring heating energy;
wherein
the cooling circuit comprises a cold buffer store integrated as a hydraulic switch, said cold buffer store being connected by pipe to an inlet of the heat pump in an upper end region, and being connected by pipe to an outlet of the heat pump in a lower end region, and also to an outlet of the cooling heat exchanger in an upper end region, and to an inlet of the cooling heat exchanger in a lower end region;
the heating circuit comprises a heat buffer store integrated as a hydraulic switch, said heat buffer store being connected by pipe to an outlet of the heat pump in an upper end region, and being connected by pipe to an inlet of the heat pump in a lower end region, and also to an inlet of the heating heat exchanger in an upper end region, and to an outlet of the heating heat exchanger in a lower end region; and
wherein a recooling means formed by a cooling tower or a cold water supply pipe and connected by pipe to the cold tank is provided to cover peak cooling power requirements;
transporting the closed containers by means of the conveyor in the direction of transport through the at least one heating zone, the at least one pasteurization zone, and the at least one cooling zone in successions;
supplying on or over the exterior of the closed containers in the the at least one heating zone, the at least one pasteurization zone, and the at least one cooling zone with the processing liquid,
said processing liquid being supplied to at least one of the at least one heating zone, the at least one pasteurization zone, and the at least one cooling zone at least partially from another one of the at least one heating zone, the at least one pasteurization zone, and the at least one cooling zone, and/or from the same zone, and/or from the cold tank and/or via a flow pipe, and
some of the processing liquid being taken from the cold tank, cooled via the cooling heat exchanger and returned to the cold tank, cooling energy being transferred to the cooling heat exchanger from the cooling circuit, and the heating energy generated in the heating circuit wherein the heat pump is used to increase the temperature of the processing liquid in the flow pipe by means of the heating heat exchanger as required;
wherein
the cooling energy generated in the heat pump is introduced into the lower end region of the cold buffer store via a coolant passed through the heat pump and cooled in this process, and the coolant is returned from the upper end region of the cold buffer store to the heat pump, and
the heating energy generated in the heat pump is introduced into the upper end region of the heat buffer store via a heating medium passed through the heat pump and heated in this process, and heating medium is returned from the upper end region of the heat buffer store to the heat pump,
wherein the processing liquid is additionally cooled in the cold tank as required by means of the recooling means.

15. The method according to claim 14, wherein the coolant is supplied to the cooling heat exchanger from the lower end region of the cold buffer store and returned to the upper end region of the cold buffer store after passing through the cooling heat exchanger.

16. The method according to claim 14, wherein the heating medium is supplied to the heating heat exchanger from the upper end region of the heat buffer store and returned to the lower end region of the heat buffer store after passing through the heating heat exchanger.

17. The method according to claim 14, wherein the temperatures of the coolant in the cold buffer store and the temperatures of the heating medium in the heat buffer store are recorded by temperature sensors arranged at least in the lower end region, in a middle region, and in the upper end region of the cold buffer store and the heat buffer store respectively.

18. The method according to claim 17, wherein the closed containers in the at least one cooling zone arranged at the end along the direction of transport are cooled to a pre-defined target temperature by means of the processing liquid, and the temperature of the coolant in the lower end region of the cold buffer store is adjusted to a temperature level below this target temperature.

19. The method according to claim 17, wherein at least some of the coolant is returned immediately to the heat pump via a bypass line after being discharged from the heat pump when the temperature of the coolant in the lower end region of the cold buffer store is recorded as being above the temperature of the processing liquid in the cold tank and/or above a threshold temperature which can be pre-defined.

20. The method according to claim 17, wherein the coolant is only supplied to the cooling heat exchanger from the lower end region of the cold buffer store if a minimum temperature level of the coolant in the lower end region of the cold buffer store has been set below a threshold temperature which can be pre-defined.

21. The method according to claim 14, wherein respective quantities of the coolant supplied to the cold buffer store and taken from the cold buffer store to supply the cooling heat exchanger are adjusted to the respective cooling demand and/or a necessary temperature level of the coolant by means of pumps with adjustable flow.

22. The method according to claim 14, wherein an inert gas in liquid form is added to the containers before these enter the at least one heating zone arranged at the start in the direction of transport.

* * * * *